(12) United States Patent
Schneider et al.

(10) Patent No.: US 9,689,886 B2
(45) Date of Patent: Jun. 27, 2017

(54) FLOW ANGLE PROBE WITH A PASSIVELY ROTATING VANE

(71) Applicant: GENERAL ELECTRIC COMPANY, Schenectady, NY (US)

(72) Inventors: Carsten Michael Schneider, Munich (DE); Vittorio Michelassi, Munich (DE); Andreas Herrig, Garching (DE); Erik Mele, Sandvika (NO); Nathaniel David Varano, Blacksburg, VA (US); Brent David Michalowski, Blacksburg, VA (US); Kenton Travis Shonhor, Roanoke, VA (US)

(73) Assignee: General Electric Company, Niskayuna, NY (US)

( * ) Notice: Subject to any disclaimer, the term of this patent is extended or adjusted under 35 U.S.C. 154(b) by 92 days.

(21) Appl. No.: 14/819,903

(22) Filed: Aug. 6, 2015

(65) Prior Publication Data

US 2016/0356805 A1    Dec. 8, 2016

Related U.S. Application Data

(60) Provisional application No. 62/172,429, filed on Jun. 8, 2015.

(51) Int. Cl.
*G01P 13/02* (2006.01)
*G01D 5/347* (2006.01)
*G01D 5/14* (2006.01)

(52) U.S. Cl.
CPC .............. *G01P 13/02* (2013.01); *G01D 5/145* (2013.01); *G01D 5/3473* (2013.01)

(58) Field of Classification Search
None
See application file for complete search history.

(56) References Cited

U.S. PATENT DOCUMENTS

| 5,138,888 A | * | 8/1992 | Walmer, Sr. | G01F 1/12 73/861.83 |
| 5,299,455 A | * | 4/1994 | Mangalam | G01P 13/025 73/180 |

(Continued)

FOREIGN PATENT DOCUMENTS

CN            202041511 U     11/2011

OTHER PUBLICATIONS

Corda et al., "Design and Flight Evaluation of a New Force-Based Flow Angle Probe", NASA, pp. 1-39, Feb. 1, 2006.

(Continued)

*Primary Examiner* — Andre Allen
(74) *Attorney, Agent, or Firm* — Pabitra K. Chakrabarti

(57) ABSTRACT

A flow angle probe is provided comprising: (a) a probe vane configured to contact a moving fluid within a fluid conduit; (b) an optional probe mounting mechanically coupled to the probe vane; (c) a rotary shaft coupled either to the optional probe mounting or the probe vane; (d) a rotary encoder coupled to the rotary shaft; (e) a sensor hermetically isolated from the probe vane and configured to sense a change in position of the rotary encoder; and (f) a probe housing encompassing at least a portion of the rotary shaft, the rotary encoder and the sensor. The novel flow angle probes disclosed herein may be used in a wide variety of turbomachines and fluid processing systems, and applications, including turbomachine design and operational control, as well as in flow assurance.

25 Claims, 10 Drawing Sheets

(56) References Cited

U.S. PATENT DOCUMENTS

| | | | |
|---|---|---|---|
| 6,526,821 B1 | 3/2003 | Corda et al. | |
| 6,729,192 B1* | 5/2004 | Feller | G01F 1/28 |
| | | | 73/861.77 |
| 7,942,065 B2 | 5/2011 | Xie | |
| 8,397,565 B1* | 3/2013 | Dillon | G01F 1/46 |
| | | | 73/170.11 |
| 2011/0098938 A1 | 4/2011 | Huang et al. | |
| 2013/0258319 A1 | 10/2013 | Schleicher et al. | |
| 2014/0020462 A1 | 1/2014 | Irani et al. | |
| 2015/0044027 A1 | 2/2015 | Michelassi et al. | |

OTHER PUBLICATIONS

Ned et al., "Fully integrated miniature, high frequency flow probe utilizing Leadless, soi technology suitable for gas turbines", A-Tech Instruments Ltd., 2010.

Kesana et al., "Ultrasonic Measurement of Multiphase Flow Erosion Patterns in a Standard Elbow", Journal of Energy Resources Technology, vol. 135, Issue 3, 11 pages, May 24, 2013.

\* cited by examiner

FLOW ANGLE PROBE WITH A PASSIVELY ROTATING VANE

CROSS REFERENCE TO RELATED APPLICATIONS

The present application claims priority to U.S. provisional application No. 62/172,429 filed Jun. 8, 2015 and which is incorporated by reference herein in its entirety.

BACKGROUND

The present invention relates to devices useful for measuring characteristics of a fluid flowing within a conduit. In particular, the present invention provides novel flow angle probes and systems containing them. Such flow angle probes may be used to detect the flow angle characteristics of a fluid flowing within a conduit.

Understanding the flow angle characteristics of a fluid moving within a fluid conduit of fluid processing equipment such as pumps and compressors can be used to optimize both equipment design and performance. While flow angles may be estimated for various equipment systems using computational fluid dynamics tools, real-time monitoring of fluid flow angles within fluid processing equipment can be challenging, especially when the fluid in question is a multiphase fluid. While flow angle measurement devices and systems are known for use in measuring the flow angle characteristics of single phase fluids, devices and systems capable of reliably measuring flow angle characteristics of multiphase fluids are currently unknown. Thus, there exists a need for new devices and systems capable of such measurements in multiphase fluids.

BRIEF DESCRIPTION

In one embodiment, the present invention provides a flow angle probe comprising: (a) a probe vane configured to contact a moving fluid within a fluid conduit; (b) a probe mounting mechanically coupled to the probe vane; (c) a rotary shaft coupled to the probe mounting; (d) a rotary encoder coupled to the rotary shaft; (e) a sensor hermetically isolated from the probe vane and configured to sense a change in position of the rotary encoder; and (f) a probe housing encompassing at least a portion of the rotary shaft, the rotary encoder and the sensor.

In an alternate embodiment, the present invention provides a system comprising: (a) a fluid conduit configured to accommodate fluid flow; (b) a flow angle probe comprising: (i) a probe vane configured to contact a moving fluid within the fluid conduit; (ii) a probe mounting mechanically coupled to the probe vane; (iii) a rotary shaft coupled to the probe mounting; (iv) a rotary encoder coupled to the rotary shaft; (v) a sensor hermetically isolated from the probe vane and configured to sense a change in position of the rotary encoder; and (vi) a probe housing encompassing at least a portion of the rotary shaft, the rotary encoder and the sensor.

In yet another embodiment, the present invention provides a flow angle probe comprising: (a) a probe vane configured to contact a moving multiphase fluid within a fluid conduit; (b) a probe mounting mechanically coupled to the probe vane; (c) a rotary shaft coupled to the probe mounting; (d) a magnet coupled to the rotary shaft; (e) a Hall sensor hermetically isolated from the probe vane and configured to sense a change in position of the magnet; and (f) a housing encompassing at least a portion of the rotary shaft, the magnet and the Hall sensor.

In yet still another embodiment, the present invention provides a flow angle probe comprising: (a) a probe vane configured to contact a moving fluid within a fluid conduit; (b) a rotary shaft coupled to the probe vane; (c) a rotary encoder coupled to the rotary shaft; (d) a sensor hermetically isolated from the probe vane and configured to sense a change in position of the rotary encoder; and (e) a probe housing encompassing at least a portion of the rotary shaft, the rotary encoder and the sensor.

In yet still another embodiment, the present invention provides a system comprising: (a) a fluid conduit configured to accommodate fluid flow; (b) a flow angle probe comprising: (i) a probe vane configured to contact a moving fluid within the fluid conduit; (ii) a rotary shaft coupled to the probe vane; (iii) a rotary encoder coupled to the rotary shaft; (iv) a sensor hermetically isolated from the probe vane and configured to sense a change in position of the rotary encoder; and (v) a probe housing encompassing at least a portion of the rotary shaft, the rotary encoder and the sensor.

In yet still another embodiment, the present invention provides a flow angle probe comprising: (a) a probe vane configured to contact a moving multiphase fluid within a fluid conduit; (b) a rotary shaft coupled to the probe vane; (c) a magnet coupled to the rotary shaft; (d) a Hall sensor hermetically isolated from the probe vane and configured to sense a change in position of the magnet; and (e) a housing encompassing at least a portion of the rotary shaft, the magnet and the Hall sensor.

BRIEF DESCRIPTION OF THE DRAWING FIGURES

Various features, aspects, and advantages of the present invention will become better understood when the following detailed description is read with reference to the accompanying drawings in which like characters may represent like parts throughout the drawings. Unless otherwise indicated, the drawings provided herein are meant to illustrate key inventive features of the invention. These key inventive features are believed to be applicable in a wide variety of systems which comprising one or more embodiments of the invention. As such, the drawings are not meant to include all conventional features known by those of ordinary skill in the art to be required for the practice of the invention.

DETAILED DESCRIPTION

Figure 1:
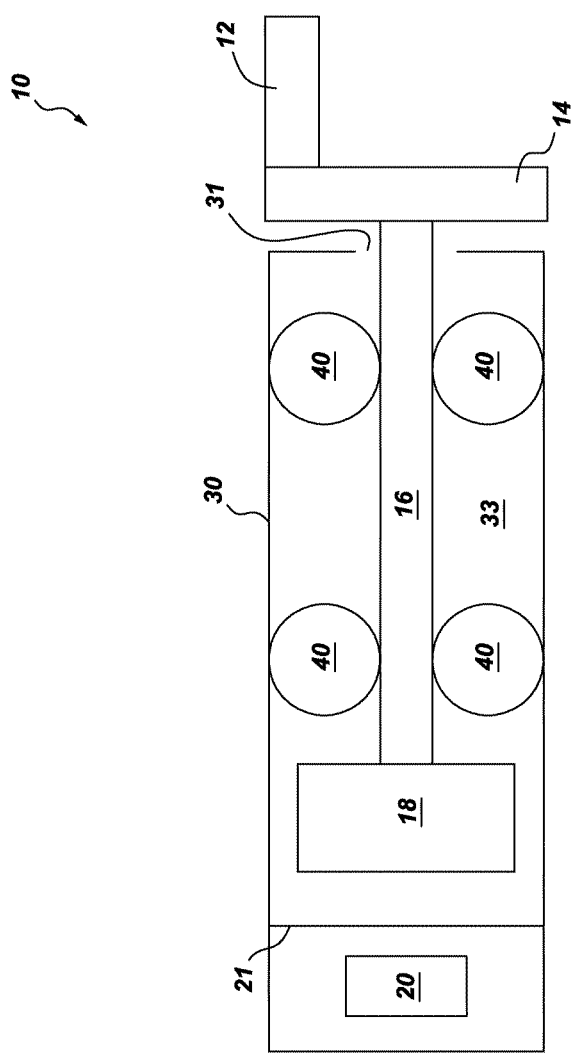
FIG. 1 illustrates a flow angle probe provided by the present invention.

In the following specification and the embodiments, which follow, reference will be made to a number of terms, which shall be defined to have the following meanings.

The singular forms "a", "an", and "the" include plural referents unless the context clearly dictates otherwise.

"Optional" or "optionally" means that the subsequently described event or circumstance may or may not occur, and that the description includes instances where the event occurs and instances where it does not.

Approximating language, as used herein throughout the specification and embodiments, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and embodiments, range limitations may be combined and/or interchanged, such ranges are identified and include all the sub-ranges contained therein unless context or language indicates otherwise.

As noted, in one or more embodiments, the present invention provides a flow angle probe for measuring the flow angle of a fluid flowing within a fluid conduit. The flow angle probe may be positioned within a fluid conduit such that a rotary vane mounted on an exterior portion of the probe moves in response to contact with a fluid flowing within the conduit. Under non-turbulent flow conditions, the moving fluid is characterized by a flow angle in the vicinity of the vane and the vane moves to a fixed position in response. Under turbulent flow conditions, however, the flow angle may vary at a rate faster than the flow angle probe can respond. Under such circumstances, the flow angle is essentially an instantaneous quantity, varying significantly over time and space within the fluid conduit. Thus, under certain turbulent flow conditions the flow angle probe provided by the present invention provides an approximated value of the flow angle in the vicinity of the probe vane. Such approximated values of flow angle may be reliably measured using the flow angle probes disclosed herein and may be used to form a moving average (or other statistical quantity) and to determine the mean flow angle and other flow characteristics with useful precision.

The position of the probe vane is communicated to a rotary encoder mechanically linked to the probe vane via rotary shaft and optionally a rotary probe mounting. The rotary encoder communicates with a sensor linked to a data processor which may compile and use the data in various beneficial ways. For example, the flow angle data may be used to map flow angles of a fluid at various locations within the fluid conduit. As will be appreciated by those of ordinary skill in the art, such flow angle mapping may be useful in the design and/or operational control of fluid processing equipment such as pumps, steam turbines, gas turbines, compressors, and like equipment. Alternatively, the data provided by the flow angle probe may be used in flow quality assurance applications, for example swirl detection upstream of swirl-sensitive measurement devices. In addition, the flow angle probe provided by the present invention may be used to detect flow disturbances occurring within a fluid conduit during production operations, for example detecting gas slugs in a multiphase production fluid being extracted from a hydrocarbon reservoir.

In one or more embodiments, the flow angle probe has as constituent parts (a) a probe vane configured to contact a moving fluid within a fluid conduit; (b) a probe mounting mechanically coupled to the probe vane; (c) a rotary shaft coupled to the probe mounting; (d) a rotary encoder coupled to the rotary shaft; (e) a sensor hermetically isolated from the probe vane and configured to sense a change in position of the rotary encoder; and (f) a probe housing encompassing at least a portion of the rotary shaft, the rotary encoder and the sensor. Such a flow angle probe 10 is illustrated by FIG. 1 in which a probe vane 12 is fixed to a probe mounting 14. The probe mounting is in turn mechanically coupled to a rotary shaft 16 supported by bearings 40. At an opposite end of the rotary shaft from the probe mounting a rotary encoder 18 is coupled to the rotary shaft and is configured to co-rotate with the rotary shaft. A housing 30 encloses a portion of rotary shaft 16, the bearings 40 and rotary encoder 18 and defines an interior cavity 33. This interior cavity is in fluid communication with the environment to which the probe vane 12 and probe mounting are exposed, via one or more housing apertures 31. The housing also encloses a sensor 20 which is configured to receive data from the rotary encoder. Sensor 20 is isolated from interior cavity 33 and the environment of the probe vane 12 by hermetic barrier 21. Data received by sensor 20 may be transmitted via a communications link 25 (FIG. 2) to a data processor for compilation and/or analysis purposes. The combination of sensor 20, rotary encoder 18 and hermetic barrier 21 is at times herein referred to as a rotary detector. Those skilled in the art will understand these interrelationships as including, for example, the nature of the signal or signals received by the sensor, the proximity of the sensor to the rotary encoder, and the degree to which the hermetic barrier acts to attenuate the received signal. One or more elements of a flow angle probe provided by the present invention are said to be configured to do a given thing when the recited element or elements are positioned in space to achieve the stated end.

Still referring to FIG. 1, during operation the flow angle probe is mounted such that the probe vane and housing apertures will be in fluid contact with the interior of the fluid conduit through which a fluid is to flow. In one or more embodiments, the flow angle probe is disposed within an opening in a wall of the fluid conduit, the opening being adapted such that the flow angle probe fits securely and hermetically within the opening, and such that the probe vane 12, the probe mounting 14 and the housing apertures are disposed within the flow channel defined by the fluid conduit. In one or more embodiments, at least a portion of the flow angle probe is disposed outside of the flow channel defined by the fluid conduit. Alternately, the entire flow angle probe may be mounted within the flow channel of the fluid conduit. Under such circumstances, the flow angle probe may be linked to a processor located outside of the fluid conduit via a communications link configured to hermetically traverse a wall of the fluid conduit. Once the flow angle probe is in position, a fluid may be caused to flow within the fluid conduit and contact the probe vane which in turn moves to a position corresponding to the flow angle of the fluid at the probe vane. The probe vane is fixed to a rotary probe mounting which is coupled to the rotary shaft. As the probe vane moves the probe mounting and rotary shaft move accordingly. The rotary encoder coupled to rotary shaft rotates likewise and halts at a position corresponding to the position of the probe vane. The probe sensor, isolated from rotary encoder by the hermetic barrier, detects the change in position of the rotary encoder and transmits the position data to a data processor. Further changes in the fluid flow angle in the vicinity of the probe vane result in further changes in the positions of the rotary components of the flow angle probe and these changes are transmitted as flow angle data to the processor by the sensor.

As noted, the interior cavity of the flow angle probe is in fluid communication with the environment surrounding the probe vane and the probe mounting. This arrangement enhances the probe's sensitivity to fluid flow in contact with the probe vane. This is in part because the rotary shaft may rotate more freely when not in contact with seals of any sort. In various embodiments, the flow angle probe provided by the present invention comprises no seals in contact with a rotary component of the probe. Thus, the flow angle probe provided by the present invention may be used to accurately record flow angles under both relatively high and relatively low dynamic pressure conditions. In one or more embodiments, it may be useful to protect the rotary encoder from the environment surrounding the probe vane, for example when the rotary encoder comprises a sensitive component susceptible to corrosion or fouling, and the environment of the probe vane induces corrosion and/or fouling. Under such circumstances, it is useful to shield the rotary encoder from the environment of the probe vane through the application of one or more protective coatings for example. In one or more embodiments, a suitable coating comprises a silicone bond coat (SS4044), and an outer coat comprising a high viscosity first liquid silicone elastomer formulation and a low viscosity second liquid silicone elastomer formulation (LSR2050 and TP3719) such as are available from Momentive (Waterford, N.Y.). Thus, in one or more embodiments, the rotary encoder is said to be hermetically isolated from the probe vane.

The probe vane may be of any shape which can be induced to move in response to contact with a fluid flowing through the fluid conduit. Typically, the probe vane moves from a first reference position to one or more positions reflecting one or more flow angles of the flowing fluid. A wedge shaped vane has been found especially suitable as it is sensitive to changes in fluid flow angle without exhibiting hysteresis to the flow angle. In addition, wedge shaped vanes may be manufactured relatively easily. In one or more embodiments, the probe vane is shaped as a triangular prism having a uniform height which is substantially greater than any other of its dimensions. In an alternate embodiment, the probe vane is pie shaped wedge and has a uniform height which is substantially greater than any other of its dimensions. The probe vane need not be of uniform height, however, and other chord and thickness distributions are also possible and may be preferable in one or more applications. In one or more embodiments, a tapered upper surface of a probe vane can enhance the inertia of the flow angle probe at a constant torque.

Sturdy, lightweight probe vanes may prepared from, for example, engineering polymers such as, PU (polyurethane), PVC, PEEK (polyether ether ketone), PAI (polyamide-imide) as exemplified by VICTREX HT and TORLON respectively, and PEI (polyether imide) as exemplified by ULTEM. Composite materials comprising organic polymers such as epoxy resins and glass or carbon fibers are suitable in a number of applications as well. Alternatively, suitable probe vanes may be prepared from metal alloys and the like. Suitable metal alloys include amagnetic corrosion resistant metal alloys such as stainless steel of type 304.

Materials suitable for use as materials of construction for the probe vane are in many instances suitable for use as materials of construction for the probe mounting, the rotary shaft and the probe housing.

A host of manufacturing techniques may be advantageously applied to make various components of the flow angle probe provided by the present invention. For example, the probe vane, probe mounting and probe housing may be produced by injection molding, microinjection molding, additive manufacturing and other known processing techniques. In some embodiments, the probe housing may comprise an amagnetic, corrosion resistant steel. In some instances, the flow angle probe provided by the present invention is advantageously small in size and can be produced using micromachining, microassembly and other microfabrication techniques known to those of ordinary skill in the art.

Figure 10:
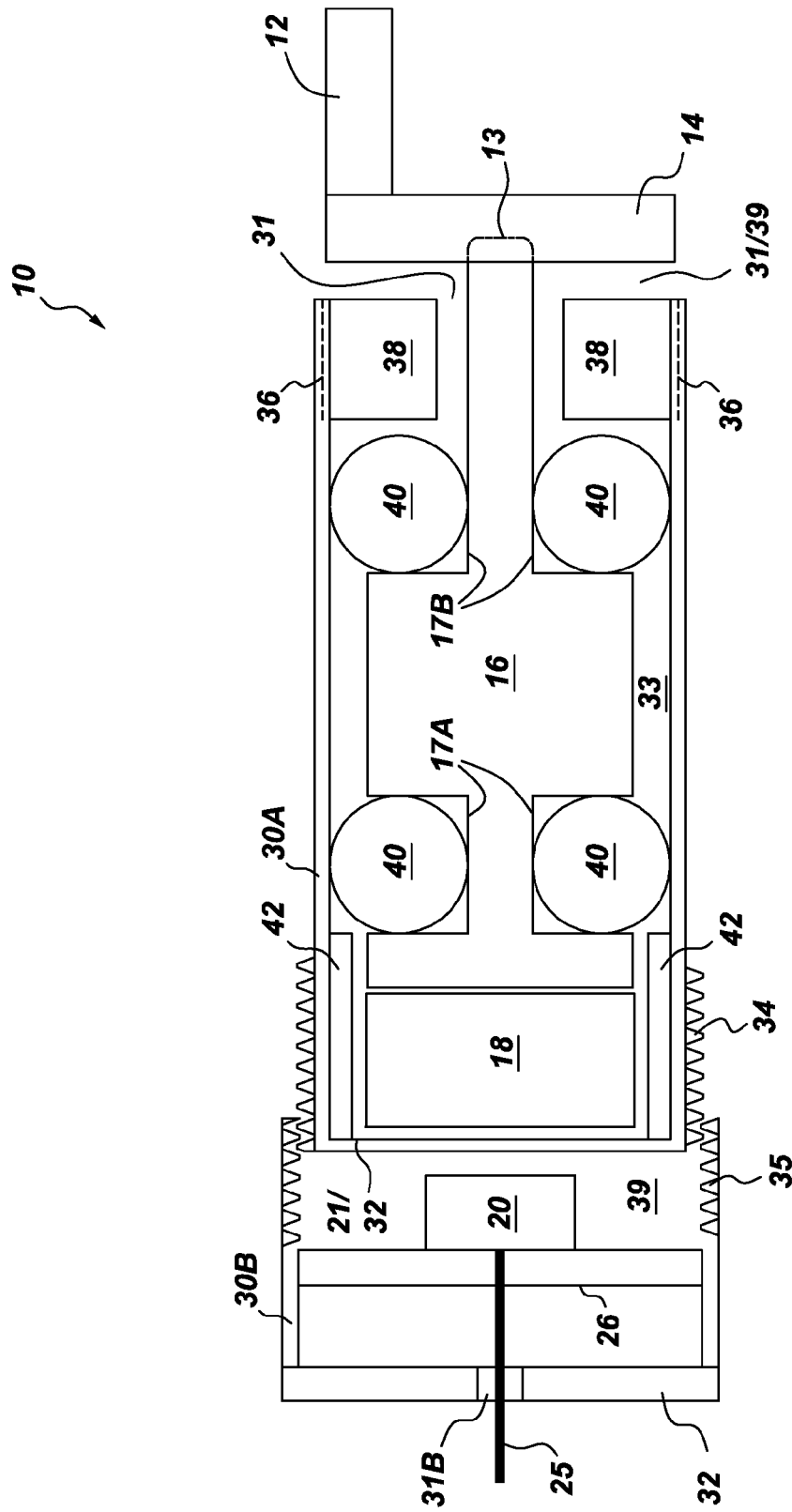
FIG. 10 illustrates a flow angle probe provided by the present invention and a method for its manufacture.

As noted, the combination of sensor 20, rotary encoder 18 and hermetic barrier 21 is at times herein referred to as a rotary detector. A simple arrangement of a rotary detector is exemplified by a Hall sensor such as the AMS AS5600 or the Infineon TLE5012B separated from a magnet attached to the rotary shaft by a hermetic barrier which allows the Hall sensor to detect changes in the position of the magnet based on changes in the magnetic field sensed by the Hall sensor. A rotary detector so configured is shown in FIG. 10 herein. In one or more embodiments, an output of the Hall sensor is an analog signal. In an alternate set of embodiments, an output of the Hall sensor is a digital signal.

In embodiments of the flow angle probe provided by the present invention comprising a Hall sensor and an associated magnet serving as the rotary encoder, the magnet may be of any type of sufficient field strength and geometry such that its rotation may be detected by the Hall sensor. The magnetic rotary encoder may have for example, a cylindrical shape, a cube shape, a cuboid shape or other multigonal shape. In one or more embodiments, the rotary encoder comprises a plurality of magnetic components, for example a trio of cube shaped magnets.

Other types of rotary detectors which may be useful in certain applications include mechanical rotary detectors in which a change in the position of the rotary encoder causes a change in the position of a component of the sensor. Because energy exchange between the rotary encoder and the sensor is typically contactless energy transfer, a change in the position of a component of the sensor will typically be induced by a change in an electric and/or magnetic field produced by the rotary encoder.

In one or more embodiments, the rotary encoder and sensor act as an optical rotary detector, the sensor comprising a light source such as a light emitting diode and one or more photodetectors such as a photodiode. In such an arrangement the rotary encoder may comprise a rotary codewheel and the sensor determines the angle of rotation of the codewheel by illuminating the codewheel and receiving the angular data as reflected light sensed at a sensor photodetector. As will be appreciated by those of ordinary skill in the art, an optical rotary detector requires at least one optical path between the sensor and the rotary encoder. This can take the form of an optical window in the hermetic barrier isolating the sensor from the rotary encoder or a fiber optic probe linking the rotary encoder and the sensor. In one embodiment, the rotary encoder comprises a reflective surface and the sensor is a transceiver configured to transmit a probe signal toward the rotary encoder and to receive a reflected signal in response. In one or more embodiments, the probe signal is infrared light. In one or more embodiments, the probe signal comprises visible light. In one or more embodiments, the probe signal is an electromagnetic signal having a frequency in a range from about 30 Hz to about 300 GHz. In one or more embodiments, the rotary detector comprises an ultrasound probe.

In one or more embodiments, the rotary encoder and sensor act as a capacitive rotary detector, such as are produced by Netzer Precision Motion Sensors Ltd. In an alternate set of embodiments, the rotary encoder and sensor act as an inductive rotary detector, such as are commercially available from Maxon Motor and Positek.

As noted, in various embodiments, the rotary encoder comprises one or more magnets. The magnet may be of various shapes and polarizations, for example a cylinder polarized along its length, or a cylinder polarized across its width. In one or more embodiments, the rotary encoder comprises a plurality of magnets.

Figure 2:
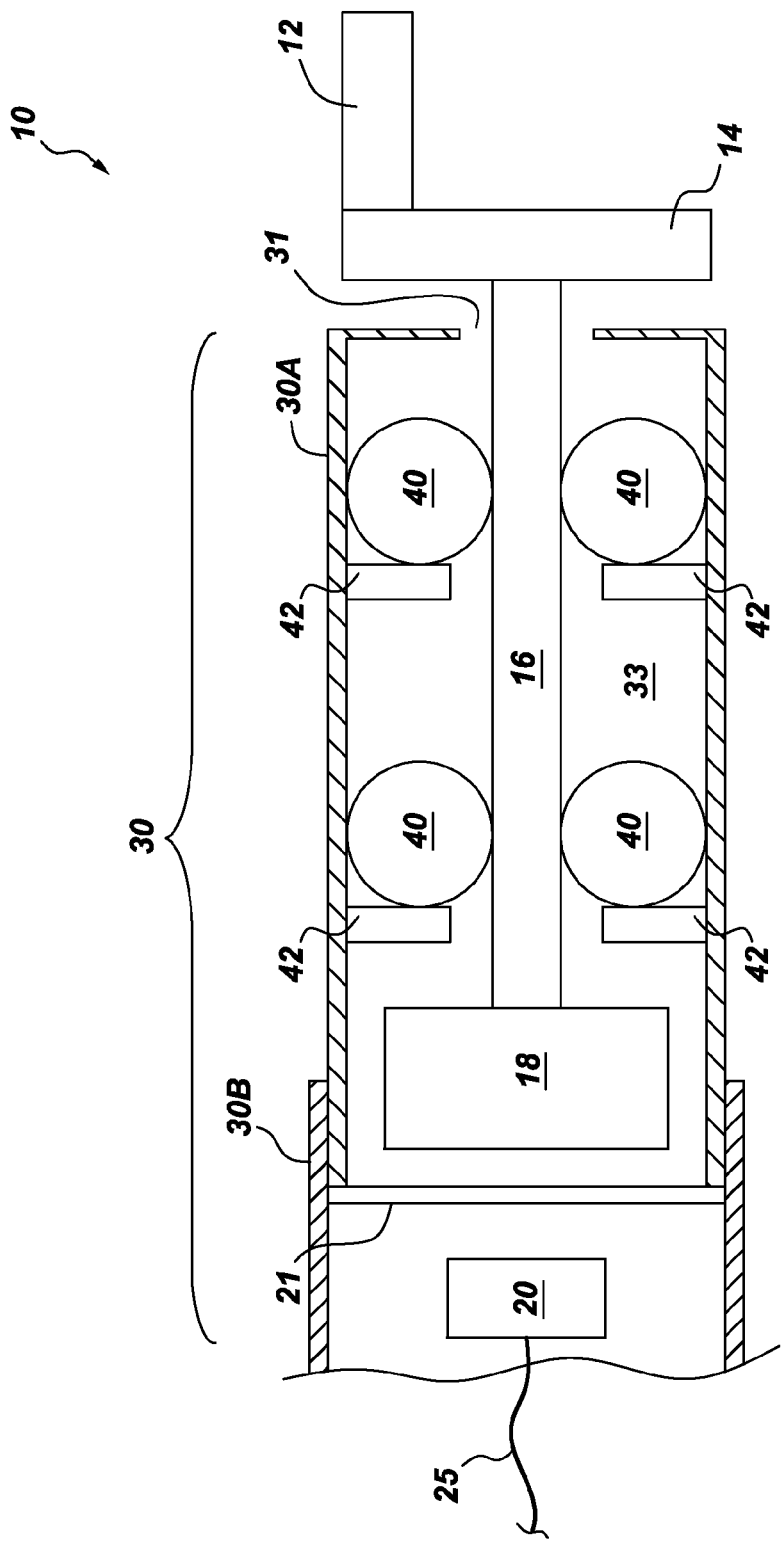
FIG. 2 illustrates a flow angle probe provided by the present invention.

Returning now to the figures, FIG. 2 represents a flow angle probe 10 provided by the present invention. In the embodiment shown, the probe housing 30 comprises two sections; a first section 30A enclosing a portion of rotary shaft 16, rotary encoder 18, bearings 40 and bearing supports 42; and a second section 30B enclosing sensor 20 and at least a portion of communications link 25. First section 30A defines housing aperture 31 which allows fluid communication between interior cavity 33 and the environment surrounding probe vane 12. Rotary encoder 18 is separated from sensor 20 by hermetic barrier 21.

Figure 3:
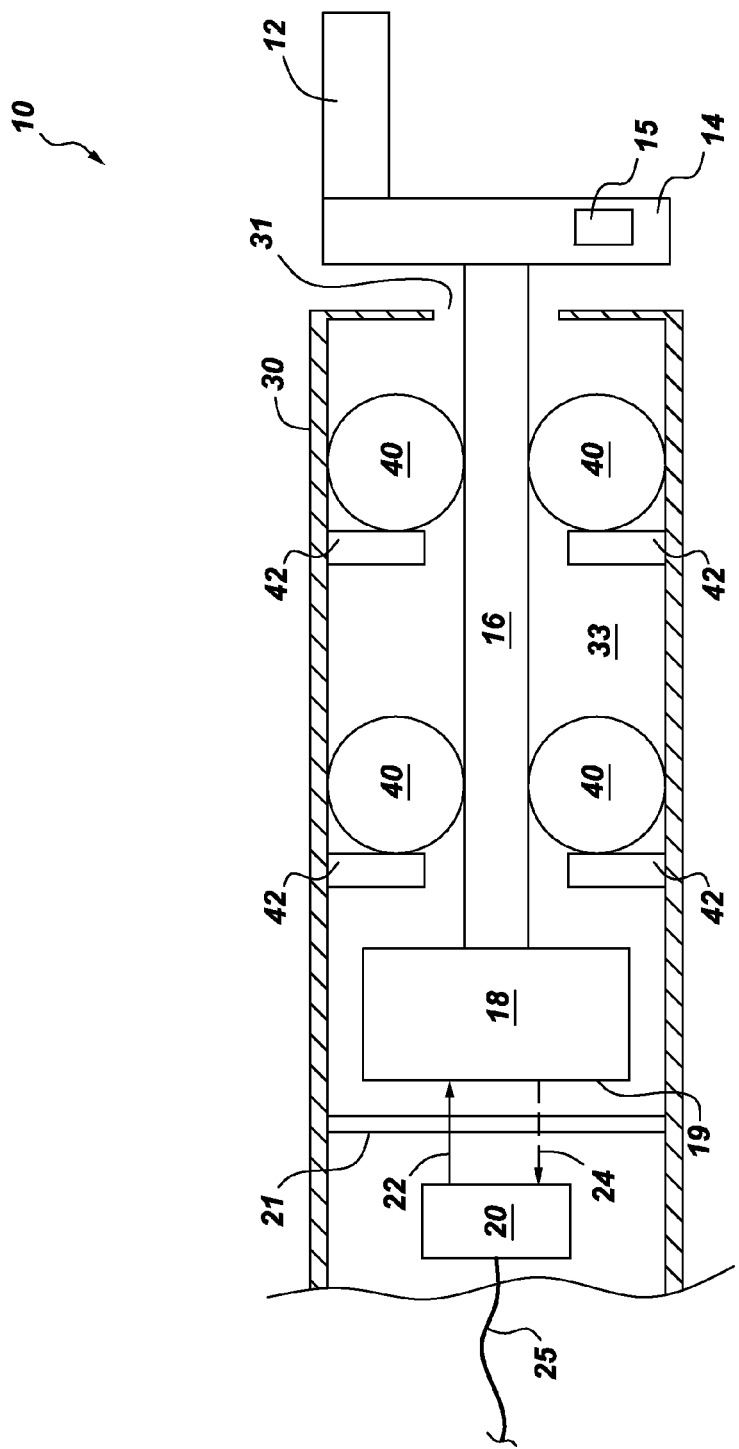
FIG. 3 illustrates a flow angle probe provided by the present invention.

Referring to FIG. 3, the figure represents a flow angle probe 10 provided by the present invention in which rotary encoder 18, sensor 20 and hermetic barrier 21 function as an optical rotary detector. In the embodiment shown, sensor 20 emits optical probe signal 22 which traverses a light transmissive hermetic barrier 21 such as glass and contacts a reflective surface 19 of rotary encoder 18. The probe signal is reflected from the surface of the rotary encoder as reflected signal 24. The rotary encoder may comprise a coded reflective surface such that the characteristics of the reflected signal will depend upon the position of the probe vane-rotary shaft-rotary encoder subassembly. In the embodiment shown, probe mounting 14 comprises at least one balancing weight 15.

Figure 4:
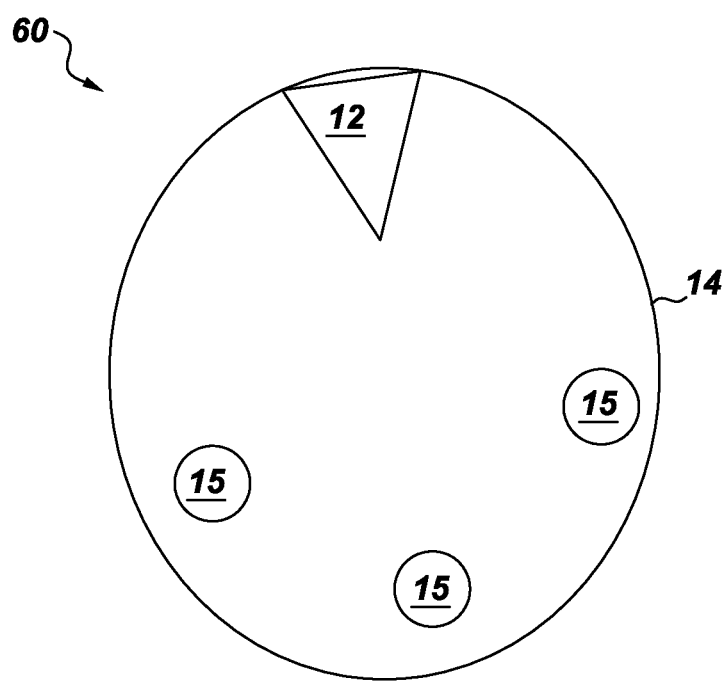
FIG. 4 illustrates a component of a flow angle probe provided by the present invention.

Referring to FIG. 4, the figure represents a component subassembly 60 of a flow angle probe provided by the present invention comprising a probe vane 12 and probe mounting 14 as seen from the top. In the embodiment shown, probe vane 12 is a triangular prism, and probe mounting 14 is disc-shaped and comprises a plurality of balancing weights 15.

Figure 5:
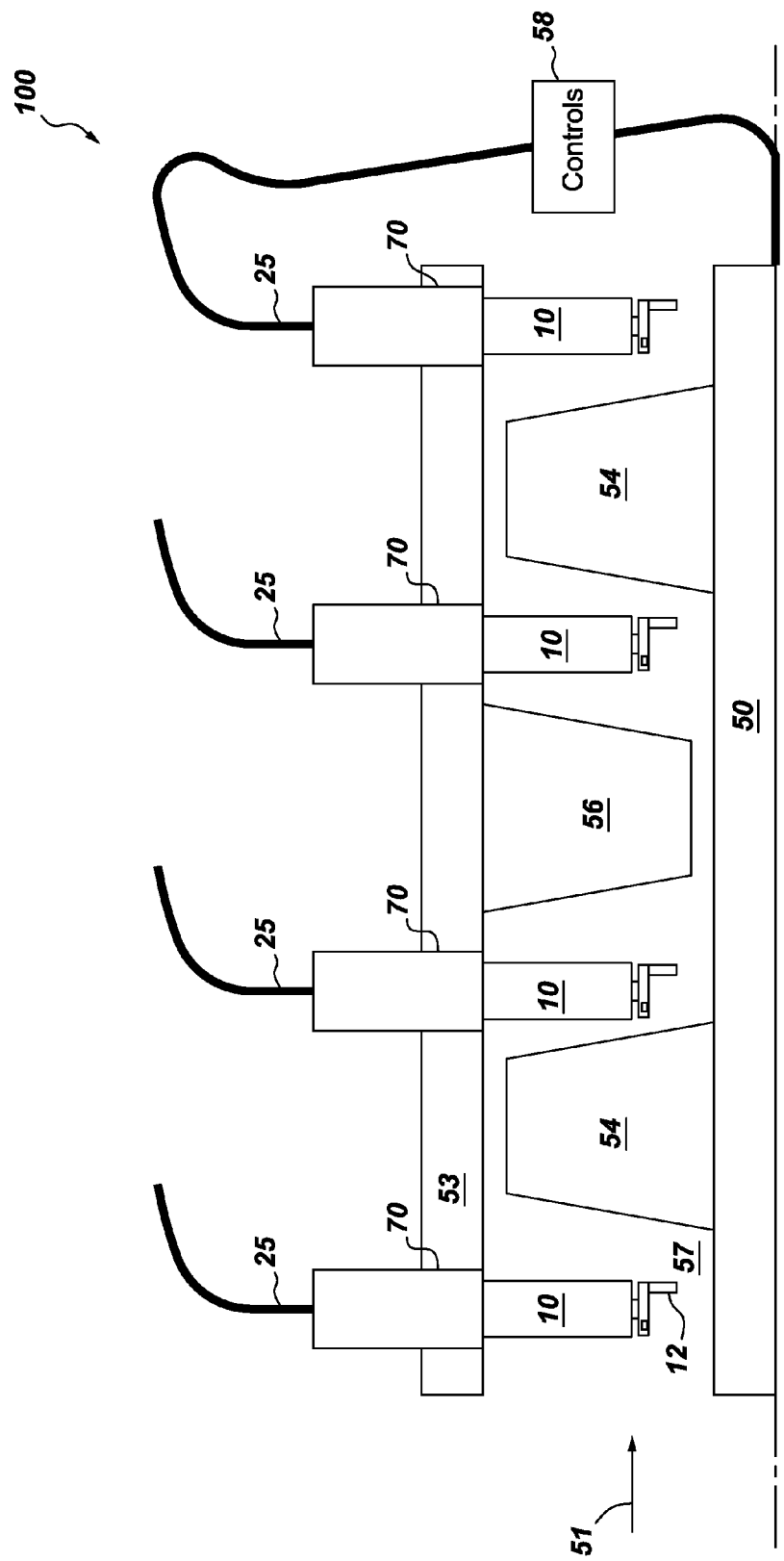
FIG. 5 illustrates a system comprising a flow angle probe provided by the present invention.

Referring to FIG. 5, the figure illustrates a system 100 comprising a plurality of flow angle probes 10 provided by the present invention. Flow angle probes 10 are shown as disposed within transverse probe ports 70. In the embodiment shown, the system is a turbomachine, for example a compressor, comprising a plurality of flow angle probes 10 deployed within the fluid conduit 53 of the machine. The system comprises a driver (not shown), rotor 50, impellers 54 affixed to the outer surface of the rotor, and at least one diffuser 56. A flow of fluid 51 entering the fluid conduit from the left encounters a first flow angle probe 10 which measures the flow angle in the vicinity of the probe vane. Fluid is compressed by the first impeller 54, and a second flow angle probe 10 measures the flow angle in the vicinity of the probe vane following this first compression stage. The fluid then encounters diffuser 56 and a third flow angle probe 10 which again measures the flow angle in the vicinity of the probe vane following this first diffuser stage. A second compression stage follows and the fluid is further compressed. A fourth flow angle probe measures the flow angle in the vicinity of the probe vane following this second compression stage. Flow angle data obtained along the fluid conduit flow channel 57 may be used to validate flow simulation studies and to validate, or refute, machine design assumptions. In one or more embodiments, the flow angle probe data is provided to a controller-processor 58 which uses the data in real time to operate the system more efficiently, for example by increasing or decreasing fluid swirl within the fluid conduit by, for example, adjusting the position of one or more guide vanes (not shown) within the fluid conduit, or by independently adjusting the speed of multiple shafts of a multi-spool fluid processing machine.

Figure 6:
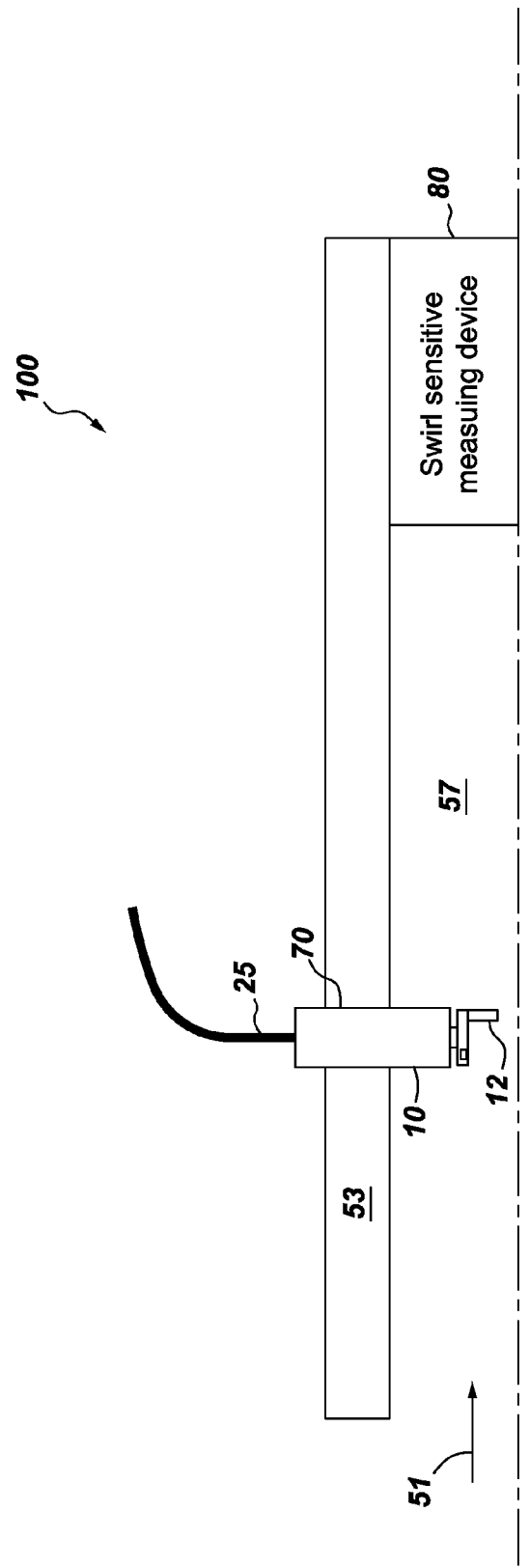
FIG. 6 illustrates a system comprising a flow angle probe provided by the present invention.

Referring to FIG. 6, the figure represents the use of a flow angle probe provided by the present invention in a flow assurance application. In the embodiment shown, flow angle probe 10 is deployed within the flow channel 57 of a fluid conduit 53 which is a pipeline. In one or more embodiments, flow angle probe 10 is deployed upstream of a swirl sensitive measuring device 80 as part of a flow assurance protocol. Flow angle probe 10 is configured to detect changes in swirl within the pipeline that may relate to changes in pipeline structural integrity. Communications link 25 may be configured to alert a remote supervisory facility of a potential or actual problem.

Figure 7:
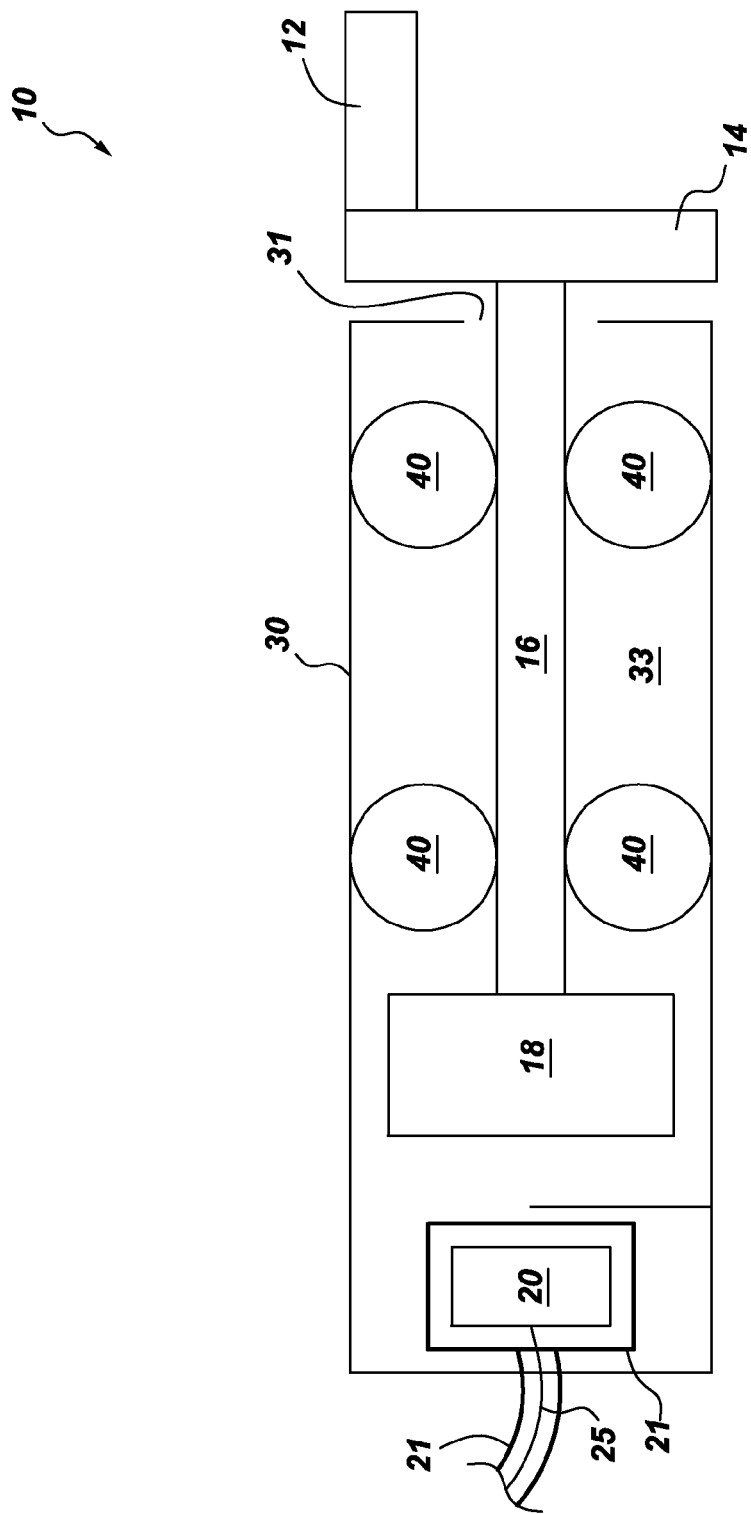
FIG. 7 illustrates a flow angle probe provided by the present invention.

Referring to FIG. 7, the figure represents a flow angle probe 10 provided by the present invention in which the sensor 20 is located within the interior cavity 33, but is hermetically isolated from the environment of the probe vane by a hermetic barrier package designated by numbered element 21.

Figure 8:
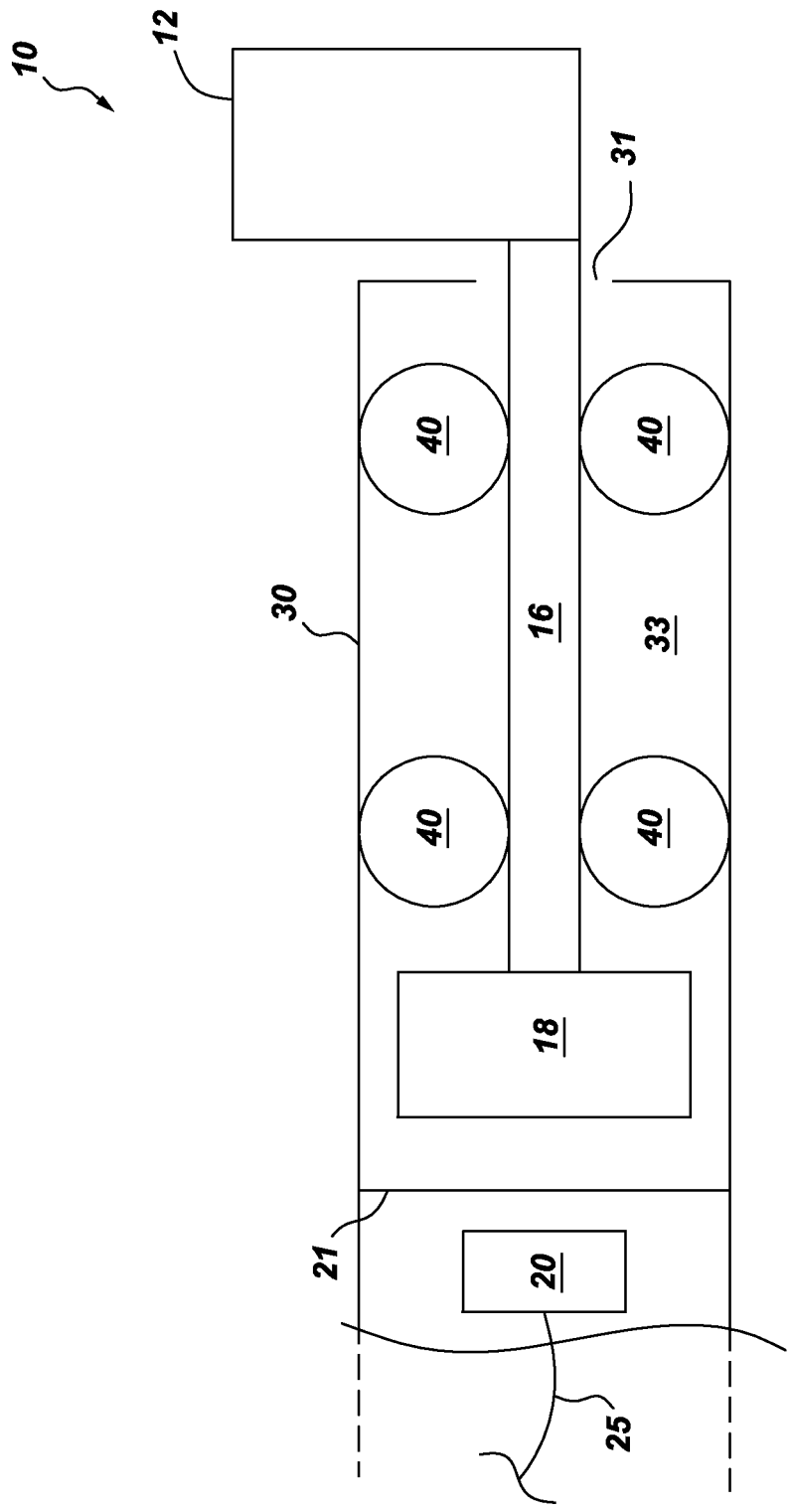
FIG. 8 illustrates a flow angle probe provided by the present invention.

Referring to FIG. 8, the figure represents a flow angle probe 10 provided by the present invention comprising a probe vane 12 configured to contact a moving fluid within a fluid conduit; a rotary shaft 16 coupled to the probe vane; a rotary encoder 18 coupled to the rotary shaft; a sensor 20 hermetically isolated from the probe vane by hermetic barrier 21. Rotary encoder 18, sensor 20 and hermetic barrier 21 are arranged within housing 30 such that a change in the position of the rotary encoder caused by its rotation is detected by the sensor. The probe housing 30 encompasses at least a portion of the rotary shaft, the rotary encoder and the sensor. Attachment of the probe vane 12 to the rotary shaft 16 without an intervening probe mounting provides a flow angle probe having enhanced sensitivity to changes in the flow angle of a fluid in contact with the probe vane.

Figure 9:
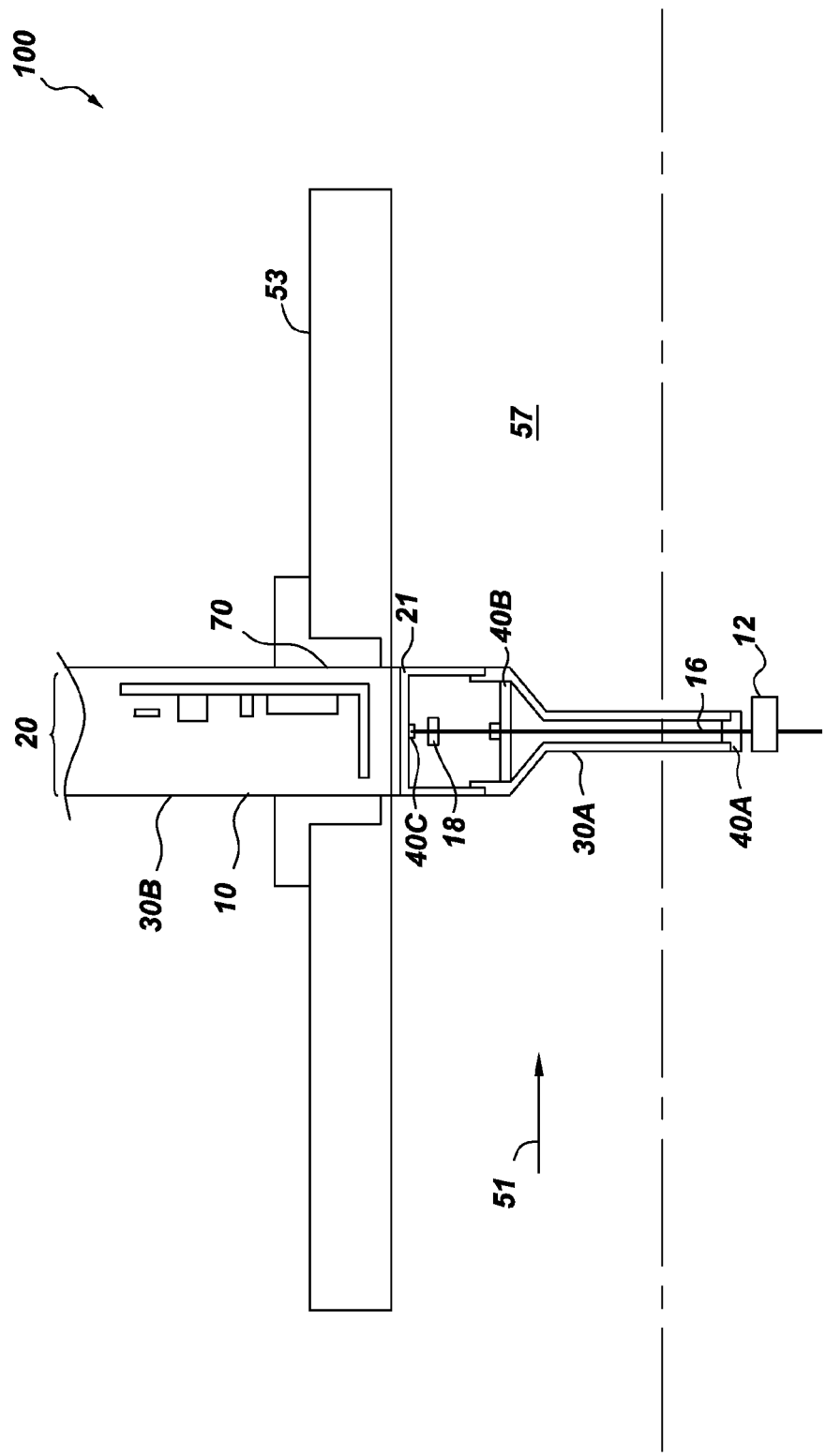
FIG. 9 illustrates a system comprising a flow angle probe provided by the present invention.

Referring to FIG. 9, the figure represents a system 100 comprising a flow angle probe 10 provided by the present invention. In the embodiment shown, the probe vane 12 is attached to the rotary shaft 16 without an intervening probe mounting. Flow angle probe 10 differs from that shown in FIG. 8 in that the rotary shaft disposed within at least a portion of housing section 30A is hermetically isolated from the environment of the probe vane 12. Either or both of bearings 40A an 40B may include one or more bearing seals configured to prevent ingress of the fluid in flow channel 57. Flow angle probe 10 comprises a needle bearing 40C which supports rotary shaft 16 which traverses rotary encoder 18. In one or more embodiments, sensor 20 is a Hall sensor and rotary encoder 18 is a magnet.

The system 100 illustrated in FIG. 9 may be, for example, a turbomachine comprising a fluid conduit 53 defining a flow channel 57 through which a fluid is caused to flow. Flow angle probe 10 is shown as disposed within a transverse probe port 70.

Methods and Results

Method 1: Flow Angle Probe

In the description which follows, useful reference may be made to FIG. 10 which illustrates a flow angle probe 10 provided by the present invention deconstructed into two components, a rotary probe component comprised within stationary housing section 30A, and a stationary sensor component comprising housing section 30B. Each housing section is cylindrical in shape and comprises a closed end 32 and an open end 39. Housing section 30B is a cylinder having larger inner and outer diameters than housing section 30A. Screw threads 35 on the interior surface of housing section 30B are configured to mate with screw threads 34 on the outer surface of housing section 30A. Housing section 30A comprises at its open end 39 a set of screw threads configured to mate with a washer-shaped threaded end wall 38. Housing section 30A also comprises bearing support structure 42, an annulus which can be fixed to the inner wall of housing section 30A at its closed end using an adhesive. Bearing support structure 42 prevents contact between the rotary encoder and the inner surface of housing section 30A.

To construct the portion of the flow angle probe comprising housing section 30A, rotary encoder 18 is attached to a first end of the rotary shaft 16. This step can be as simple as using an adhesive such as an epoxy glue to fix the rotary encoder to the rotary shaft. Alternatively, the rotary shaft can be equipped with a mounting configured to secure the rotary encoder to the rotary shaft in which case the order of attachment of the bearings and the rotary encoder may be reversed. Bearings 40 are then introduced into shaft grooves 17A and 17B to provide a subassembly comprising rotary encoder 18, rotary shaft 16 and bearings 40. This subassembly is then inserted into the interior of a housing section 30A containing bearing support structure 42 fixed within it. An end portion of the rotary shaft extends beyond the open end 39 of housing section 30A. Threaded end wall 38, a washer-shaped structure having screw threads on its outer radial surface and defining a cylindrical channel through its center, is then engaged to the end of the rotary shaft. The screw threads of threaded end wall 38 are then mated to the screw threads on the inner surface of housing section 30A at its open end to secure the subassembly comprising rotary encoder 18, rotary shaft, 16 and bearings 40 within housing section 30A. The cylindrical channel of threaded end wall 38 is sized such that a gap is left between the inner wall of the threaded end wall and the outer surface of the rotary shaft 16. This gap, also referred to as an aperture is designated by element number 31 in FIG. 10. The gap permits fluid communication between the environment of the probe vane and the interior 33 of housing section 30A.

A portion of the rotary shaft extending beyond the threaded end wall 38 is engaged to a subassembly comprising probe vane 12 and probe mounting 14. Probe mounting 14 defines a cavity 13 configured to accommodate an end portion of rotary shaft 16. The probe mounting is positioned on the end of the rotary shaft and pressed to secure it to the rotary shaft to create thereby a friction coupling between the rotary shaft and the walls of cavity 13. Apart from contact with rotary shaft 16, and probe vane 12, probe mounting 14 does not otherwise contact components of the flow angle probe.

To construct the portion of the flow angle probe comprising housing section 30B, a sensor 20 is attached to sensor support 26 within the interior of housing section 30B. Sensor support 26 is configured to allow passage of communications link 25 to closed end 32 of housing section 30B and through aperture 31B which may be appropriately sealed with an epoxy adhesive, for example. An adhesive such as a LOCTITE adhesive may be applied to threads 34 and 35 when the two housing sections are joined by mating threads 34 and 35. In the resultant completed flow angle probe, closed end 32 of housing section 30A serves as a hermetic barrier 21 between the interior cavity 33 of housing section 30A and the sensor disposed within housing section 30B.

In the method of construction just described, housing sections 30A, 30B, sensor support 26, bearing support 42, rotary shaft and threaded end wall 38 are conveniently prepared from an magnetic stainless steel, such as type 304 stainless steel. Sensor 20 is advantageously a Hall sensor and rotary encoder 18 is a cube magnet comprising neodymium. Bearings 40 are advantageously low friction ceramic bearings and the subassembly comprising probe vane 12 and probe mounting 14 is conveniently prepared as a single unit by machining an appropriately sized block of PEEK to provide a subassembly in which the probe vane has a pie wedge shape and the probe mounting is disc shaped. Similarly, screw threads 34 and 35, and those threads corresponding to threaded connection 36 may be created on the appropriate surfaces of the housing sections using known machining techniques.

Method 2: Flow Angle Probe Validation Testing

Flow angle tests were carried out on a 15 meter multiphase fluid vertical test rig at the Institute for Energy Technology (IFE) in Kjeller, Norway. An experimental flow angle probe constructed at Aeroprobe Corporation of Christiansburg, Va. and was used in the tests described herein. The cylindrical flow angle probe was about 50 millimeters in length and was approximately 10 millimeters in diameter. The probe vane and probe mounting were made of aluminum and were affixed to the rotary shaft with retaining clips. The probe vane was approximately 6 millimeters in length. The probe mounting was an aluminum disc approximately 2 millimeters thick and approximately 10 millimeters in diameter. A pair of stainless steel balancing weights in the probe mounting provided for enhanced sensitivity of the probe vane to changes in the characteristics of the test fluid. The aluminum rotary shaft was approximately 9.5 millimeters in length. A neodymium cube magnet was fixed to the shaft end opposite the probe mounting. The rotary shaft was held in position by four double ceramic ball bearings fixed inside the interior cavity of a first portion of the probe housing with a retaining C-clip. A second portion of the probe housing contained a Hall sensor and communications link, and was mated to the first portion of the probe housing with complementary sets of screw threads as described in Method 1 above. The end wall of the first portion of the probe housing provided a hermetic barrier between the Hall sensor and the interior probe cavity containing the rotary shaft and magnet.

The probe was attached to an approximately 650 millimeter stainless steel shaft and inserted through a traverse probe port of the fluid conduit of the test rig about 12 meters above the rig's fluid pump. The fluid conduit was approximately 100 millimeters in diameter. The flow angle probe was positioned orthogonal to the direction of flow within the test rig fluid conduit and such that the probe vane was astride the center axis of the fluid conduit in order to minimize boundary effects at the fluid conduit wall surface. The test rig was equipped with a downstream gas-liquid separator and recycle loops to channel gas and liquid test fluids back to a fluid mixer upstream of the straight 15 meter long vertical test section. The water loop was driven by a pump and the gas loop was driven by a compressor. The steel shaft attached the flow angle probe was supported by a motor-driven, rotary table which was rotated to angles between +90 degrees and −90 degrees relative to a reference point in which the probe vane was aligned with flow through the fluid conduit. In these validation tests, rotation of the steel shaft caused the Hall sensor to rotate to the same degree as the shaft since the Hall sensor was not configured to rotate within the flow angle probe. The probe vane, however, remained aligned with the flow of fluid through the test rig fluid conduit and as a result the cube magnet was not displaced from its alignment position. As the Hall sensor was rotated through a series of fixed angles between +90 and −90 degrees around the reference point, it sensed an angular position relative to the stationary cube magnet and the angular position data was transmitted to a data processor. In operation, the movement of the Hall sensor and data collection were automated using one or more data processing and controller systems. At each fixed angle selected, Hall sensor data was sampled at 150 hertz over a ten second collection time and the resultant 1500 sample data set was averaged to produce an average value. Over a wide range of conditions, the error between the angle produced by physical rotation of the Hall sensor by the rotary table, and the angle sensed by the Hall sensor relative to the cube magnet was less than 2 degrees. Flow angle probe performance was robust under a wide variety of conditions including conditions of 0% (water only) and 100% (air only) gas-volume fractions, and gas-liquid regimes having gas-volume fractions intermediate 0% and 100%. Dynamic pressures within the fluid conduit above 200 Pa favored closer agreement between the fixed angle by which the Hall sensor was known to have been rotated and the angle detected by the Hall sensor interacting with the cube magnet. Tests were conducted up to about 10 k Pa dynamic pressure. Within a dynamic pressure range from 200 Pa to 10 k Pa flow angle accuracy including alignment, sensor zeroing and varying flow conditions was about +/−3.3°.

The foregoing examples are merely illustrative, serving to illustrate only some of the features of the invention. The appended claims are intended to illustrate the invention as broadly as it has been conceived and the examples herein presented are illustrative of selected embodiments from a manifold of all possible embodiments. Accordingly, it is Applicants' intention that the appended claims are not to be limited by the choice of examples utilized to illustrate features of the present invention. As used in the claims, the word "comprises" and its grammatical variants logically also subtend and include phrases of varying and differing extent such as for example, but not limited thereto, "consisting essentially of" and "consisting of." Where necessary, ranges have been supplied, those ranges are inclusive of all sub-ranges there between. It is to be expected that variations in these ranges will suggest themselves to a practitioner having ordinary skill in the art and where not already dedicated to the public, those variations should where possible be construed to be covered by the appended claims. It is also anticipated that advances in science and technology will make equivalents and substitutions possible that are not now contemplated by reason of the imprecision of language and these variations should also be construed where possible to be covered by the appended claims.

What is claimed is:

1. A flow angle probe for measuring a flow angle of a fluid moving within a fluid conduit, the flow angle probe comprising:
    a single probe vane configured to contact a moving fluid within a fluid conduit;
    a probe mounting fixed to the probe vane;
    a rotary shaft coupled to the probe mounting and supported by a plurality of bearings to allow the rotary shaft to rotate with the probe vane;
    a rotary encoder coupled to the rotary shaft and is configured to rotate with the rotary shaft;
    a sensor hermetically isolated from the probe vane and configured to sense a change in rotational position of the rotary encoder; and
    a probe housing encompassing at least a portion of the rotary shaft, the rotary encoder and the sensor,
    wherein the moving fluid within the fluid conduit causes the probe vane to passively rotate to a position corresponding to a flow angle of the moving fluid, and
    wherein the rotary shaft and the rotary encoder rotate to a position corresponding to the position of the probe vane, and
    wherein the position of the rotary encoder is detected by the sensor as a flow angle of the moving fluid within the fluid conduit.

2. The flow angle probe according to claim 1, wherein the rotary encoder and sensor act as a mechanical rotary detector.

3. The flow angle probe according to claim 1, wherein the rotary encoder and sensor act as an optical rotary detector.

4. The flow angle probe according to claim 1, wherein the rotary encoder and sensor act as a magnetic rotary detector.

5. The flow angle probe according to claim 4, wherein the rotary encoder is a magnet and wherein the sensor is a Hall sensor.

6. The flow angle probe according to claim 1, wherein the rotary encoder and sensor act as a capacitive rotary detector.

7. The flow angle probe according to claim 1, wherein the rotary encoder and sensor act as an inductive rotary detector.

8. The flow angle probe according to claim 1, wherein the rotary encoder comprises a reflective surface and the sensor is a transceiver configured to transmit a probe signal toward the rotary encoder and to receive a reflected signal in response.

9. A system comprising:
    a fluid conduit configured to accommodate fluid flow; and
    a flow angle probe comprising:
        a single probe vane configured to contact a moving fluid within the fluid conduit;
        a probe mounting fixed to the probe vane;
        a rotary shaft coupled to the probe mounting and supported by a plurality of bearings to allow the rotary shaft to rotate with the probe vane;
        a rotary encoder coupled to the rotary shaft and is configured to rotate with the rotary shaft;
        a sensor hermetically isolated from the probe vane and configured to sense a change in rotational position of the rotary encoder; and
        a probe housing encompassing at least a portion of the rotary shaft, the rotary encoder and the sensor,
    wherein the moving fluid within the fluid conduit causes the probe vane to passively rotate to a position corresponding to a flow angle of the moving fluid, and
    wherein the rotary shaft and the rotary encoder rotate to a position corresponding to the position of the probe vane, and
    wherein the position of the rotary encoder is detected by the sensor as a flow angle of the moving fluid within the fluid conduit.

10. The system according to claim 9, wherein the rotary encoder and sensor act as a rotary detector selected from the group consisting of mechanical rotary detectors, optical rotary detectors, magnetic rotary detectors, capacitive rotary detectors, and inductive rotary detectors.

11. The system according to claim 9, wherein the rotary shaft is supported by a plurality of ceramic bearings.

12. The system according to claim 9, wherein the housing is comprised of an magnetic corrosion resistant metal alloy.

13. The system according to claim 9, wherein the probe mounting comprises a plurality of balance weights.

14. A flow angle probe comprising:
    a single probe vane configured to contact a moving multiphase fluid within a fluid conduit;

a probe mounting fixed to the probe vane;

a rotary shaft coupled to the probe mounting and supported by a plurality of bearings to allow the rotary shaft to rotate with the probe vane;

a magnet coupled to the rotary shaft and configured to rotate with the rotary shaft;

a Hall sensor hermetically isolated from the probe vane and configured to sense a change in position of the magnet; and a housing encompassing at least a portion of the rotary shaft, the magnet and the Hall sensor, wherein the moving fluid within the fluid conduit causes the probe vane to passively rotate to a position corresponding to a flow angle of the moving fluid, and wherein the rotary shaft and the magnet rotate to a position corresponding to the position of the probe vane, and wherein the position of the magnet is detected by the Hall sensor as a flow angle of the moving fluid within the fluid conduit.

15. A flow angle probe comprising:

a single probe vane configured to contact a moving fluid within a fluid conduit;

a rotary shaft fixed to the probe vane;

a rotary encoder coupled to the rotary shaft and supported by a plurality of bearings to allow the rotary shaft to rotate with the probe vane;

a sensor hermetically isolated from the probe vane and configured to sense a change in rotational position of the rotary encoder; and a probe housing encompassing at least a portion of the rotary shaft, the rotary encoder and the sensor, wherein the moving fluid within the fluid conduit causes the probe vane to passively rotate to a position corresponding to a flow angle of the moving fluid, and wherein the rotary shaft and the rotary encoder rotate to a position corresponding to the position of the probe vane, and wherein the position of the rotary encoder is detected by the sensor as a flow angle of the moving fluid within the fluid conduit.

16. The flow angle probe according to claim 15, wherein the rotary encoder and sensor act as a mechanical rotary detector.

17. The flow angle probe according to claim 15, wherein the rotary encoder and sensor act as an optical rotary detector.

18. The flow angle probe according to claim 15, wherein the rotary encoder and sensor act as a magnetic rotary detector.

19. The flow angle probe according to claim 18, wherein the rotary encoder is a magnet and wherein the sensor is a Hall sensor.

20. The flow angle probe according to claim 15, wherein the rotary encoder and sensor act as a capacitive rotary detector.

21. The flow angle probe according to claim 15, wherein the rotary encoder and sensor act as an inductive rotary detector.

22. A system comprising:

a fluid conduit configured to accommodate fluid flow; and a flow angle probe comprising:

a single probe vane configured to contact a moving fluid within the fluid conduit;

a rotary shaft fixed to the probe vane;

a rotary encoder coupled to the rotary shaft and supported by a plurality of bearings to allow the rotary shaft to rotate with the probe vane;

a sensor hermetically isolated from the probe vane and configured to sense a change in rotational position of the rotary encoder; and a probe housing encompassing at least a portion of the rotary shaft, the rotary encoder and the sensor, wherein the moving fluid within the fluid conduit causes the probe vane to passively rotate to a position corresponding to a flow angle of the moving fluid, and wherein the rotary shaft and the rotary encoder rotate to a position corresponding to the position of the probe vane, and wherein the position of the rotary encoder is detected by the sensor as a flow angle of the moving fluid within the fluid conduit.

23. The system according to claim 22, wherein the rotary encoder and sensor act as a rotary detector selected from the group consisting of mechanical rotary detectors, optical rotary detectors, magnetic rotary detectors, capacitive rotary detectors, and inductive rotary detectors.

24. The flow angle probe according to claim 22, wherein the rotary encoder comprises a reflective surface and the sensor is a transceiver configured to transmit a probe signal toward the rotary encoder and to receive a reflected signal in response.

25. The flow angle probe according to claim 24, wherein the probe signal is visible light.

* * * * *